United States Patent
Liu et al.

(10) Patent No.: US 11,041,587 B2
(45) Date of Patent: Jun. 22, 2021

(54) ULTRAVIOLET CURING PIPELINE REPAIR ROBOT AND SYSTEM

(71) Applicant: WUHAN EASY-SIGHT TECHNOLOGY CO., LTD., Hubei (CN)

(72) Inventors: Zhiguo Liu, Hubei (CN); Yanlei Lu, Hubei (CN); Jia Yu, Hubei (CN); Xiang Wang, Hubei (CN); Wanjia Zhang, Hubei (CN); Hao Li, Hubei (CN)

(73) Assignee: WUHAN EASY-SIGHT TECHNOLOGY CO., LTD., Hubei (CN)

( * ) Notice: Subject to any disclaimer, the term of this patent is extended or adjusted under 35 U.S.C. 154(b) by 16 days.

(21) Appl. No.: 16/632,884

(22) PCT Filed: May 8, 2018

(86) PCT No.: PCT/CN2018/085954
§ 371 (c)(1),
(2) Date: Jan. 22, 2020

(87) PCT Pub. No.: WO2019/024558
PCT Pub. Date: Feb. 7, 2019

(65) Prior Publication Data
US 2020/0166172 A1     May 28, 2020

(30) Foreign Application Priority Data

Aug. 1, 2017   (CN) .......................... 201710648397.9
Aug. 1, 2017   (CN) .......................... 201720950363.0

(51) Int. Cl.
*F16L 55/40*     (2006.01)
*F16L 55/162*    (2006.01)
(Continued)

(52) U.S. Cl.
CPC ............. *F16L 55/40* (2013.01); *F16L 55/162* (2013.01); *B32B 2597/00* (2013.01); *F16L 55/18* (2013.01);
(Continued)

(58) Field of Classification Search
CPC ....... F16L 55/162; F16L 55/165; F16L 55/40; F16L 55/18; F16L 55/26; F16L 2101/10; F16L 2101/30; B29C 2035/0833
(Continued)

(56) References Cited

U.S. PATENT DOCUMENTS 6,820,653 B1 * 11/2004 Schempf ................. B08B 9/043
138/97
2010/0051168 A1 * 3/2010 Moeskjaer ............ F16L 55/165
156/64
(Continued)

FOREIGN PATENT DOCUMENTS

| CN | 103316817 | 9/2013 |
|---|---|---|
| CN | 105276333 | 1/2016 |

(Continued)

OTHER PUBLICATIONS

"International Search Report (Form PCT/ISA/210) of PCT/CN2018/085954," dated Jul. 31, 2018, with English translation thereof, pp. 1-5.

*Primary Examiner* — Patrick F Brinson
(74) *Attorney, Agent, or Firm* — JCIPRNET

(57) ABSTRACT

An ultraviolet curing pipeline repair robot is provided. The ultraviolet radiation lamp comprises a lamp panel distributed at the circumference of frame body and ultraviolet LED lamps uniformly distributed on the lamp panel. Each frame body is provided with a spring sleeve circumferentially rotating around frame body. Each driving arm is formed by cross connection of two supporting arms. One end of the first
(Continued)

supporting arm is fixedly arranged on frame body, one end of the second supporting arm is connected with a driving arm nut, and the driving arm nut is sleeved the spring sleeve and matched with the screw thread on the outer surface of the spring sleeve. The inside of a tail section of frame body is provided with a network transmission module and a first power carrier module connected with a second aviation plug. A cable is a power cable.

10 Claims, 4 Drawing Sheets

(51) Int. Cl.
  *F16L 55/18* (2006.01)
  *F16L 101/12* (2006.01)
  *F16L 101/18* (2006.01)
  *F16L 101/30* (2006.01)
(52) U.S. Cl.
  CPC ....... *F16L 2101/12* (2013.01); *F16L 2101/18* (2013.01); *F16L 2101/30* (2013.01)

(58) Field of Classification Search
  USPC ......... 138/97, 98; 156/64, 379.6, 378, 275.5
  See application file for complete search history.

(56) References Cited

U.S. PATENT DOCUMENTS

| 2011/0107571 | A1 | 5/2011 | Kerdiles et al. |
| 2011/0259460 | A1 | 10/2011 | Bauer |
| 2014/0261832 | A1* | 9/2014 | Kiest, Jr. ............... B29C 73/025 138/97 |
| 2016/0010781 | A1* | 1/2016 | Kiest, Jr. ............ F16L 55/16455 138/98 |
| 2018/0106413 | A1* | 4/2018 | Kuzniar ............. B29C 35/0805 |
| 2018/0162017 | A1* | 6/2018 | Kuzniar ............. B29C 35/0805 |
| 2018/0194072 | A1* | 7/2018 | Kuzniar .................. F16L 55/40 |
| 2018/0229404 | A1* | 8/2018 | Starr ................... B29C 35/0805 |

FOREIGN PATENT DOCUMENTS

| CN | 105318141 | 2/2016 |
| CN | 107366798 | 11/2017 |
| CN | 207122715 | 3/2018 |

* cited by examiner

ULTRAVIOLET CURING PIPELINE REPAIR ROBOT AND SYSTEM

CROSS-REFERENCE TO RELATED APPLICATION

This application is a 371 of international application of PCT application serial no. PCT/CN2018/085954, filed on May 8, 2018, which claims the priority benefit of China application no. 201720950363.0 and 201710648397.9, filed on Aug. 1, 2017. The entirety of each of the above mentioned patent applications is hereby incorporated by reference herein and made a part of this specification.

TECHNICAL FIELD

The present invention belongs to the field of ultraviolet curing pipelines and specifically relates to an ultraviolet curing pipeline repair robot and system.

BACKGROUND

Various damages and leakages may be unavoidably generated due to corrosion and poor operation management after various pipelines operate for many years so as to bring serious economic losses, however, the whole-line replacement of new pipelines is not only huge in work amount, but also high in cost and long in construction period. How to economically, efficiently and rapidly recover the safety operation of pipelines has attracted great attention at home and abroad, and therefore, it is very significant to research a pipeline repair technology.

A material hose is dragged into an underground pipeline by using a dragging method in an ultraviolet curing method. A novel lined pipe is formed in an existing pipeline after being hardened by using an ultraviolet curing technology so as to replace functions of an original pipeline. When the material hose is dragged by using the method, a great tensile force is needed, generally, a mulching film is laid in the pipeline in advance, and then, construction is performed. The method is high in construction efficiency, the repair and update of the pipeline can be finished within several hours, and meanwhile, the method simultaneously has the characteristics of environment friendliness and safety in a construction process. Little influences on traffic are generated. The aims of 100% non-excavation lining repair and no excavation of working pits are truly achieved.

At present, no ultraviolet curing pipeline repair robots have been produced and researched and developed in China. Manufacturers have appeared abroad. However, robots produced by foreign manufacturers are incapable of adapting to pipelines with different pipe diameters and are

SUMMARY

The technical problem to be solved by the present invention is to provide an ultraviolet curing pipeline curing robot and system capable of adapting to pipelines with different pipe diameters and capable of improving a curing effect.

A technical solution adopted for solving the above-mentioned technical problem in the present invention is that an ultraviolet curing pipeline curing robot comprises several sections of frame bodies connected in sequence, the frame bodies include a first section of frame body, a middle section of frame body and a tail section of frame body, wherein the front end of the first section of frame body is connected with a front-view camera, each section of frame body is fixedly provided with an ultraviolet radiation lamp and is connected with driving arms, and the tail ends of the driving arms are connected with wheels configured to roll on the inner wall of a pipeline, and the ultraviolet curing pipeline curing robot is characterized in that the first section of frame body is connected with the middle section of frame body by a first aviation plug, the two connected ends of the middle section of frame body are provided with first aviation plugs, the middle section of frame body is connected with the tail section of frame body by a first aviation plug, and the tail end of the tail section of frame body is provided with a second aviation plug configured to be connected with a control system via a cable;

each ultraviolet radiation lamp comprises a lamp panel distributed in the circumferential direction of the corresponding section of frame body and ultraviolet LED lamps uniformly distributed on the lamp panel;

each section of frame body is provided with a spring sleeve, the outer surface of the spring sleeve is provided with a screw thread, and the spring sleeve is capable of circumferentially rotating around the section of frame body;

at least three driving arms are provided and are uniformly distributed in the circumferential direction of the corresponding section of frame body; each driving arm is formed by cross connection of two supporting arms, wherein one end of the first supporting arm is fixedly arranged on the corresponding section of frame body, the other end of the first supporting arm is connected with the corresponding wheel, one end of the second supporting arm is connected with a driving arm nut, the driving arm nut sleeves the corresponding spring sleeve and is matched with the screw thread on the outer surface of the spring sleeve, and the other end of the second supporting arm is connected with the corresponding wheel; and each section of frame body is provided with an environment monitoring sensor, the inside of each section of frame body is provided with a microprocessor, the output end of the environment monitoring sensor is connected with the microprocessor, and the microprocessor is further connected with switch control ends of the ultraviolet LED lamps; the inside of the tail section of frame body is further provided with a network transmission module and a first power carrier module, and the first power carrier module is connected with the second aviation plug; and the cable is a power cable.

According to the above-mentioned solution, the outer part of the front-view camera is provided with a shell, and the shell is provided with an air pressure indicator lamp and an air valve which are connected with the microprocessor in the first section of frame body.

According to the above-mentioned solution, the shell of the front-view camera is connected with a driving shaft and a driving mechanism which are configured to drive the front-view camera to rotate, and the driving mechanism is controlled by the microprocessor in the front section of frame body.

According to the above-mentioned solution, the tail section of frame body is further connected with a rear-view camera, and the rear-view camera is connected with the microprocessor in the tail section of frame body.

According to the above-mentioned solution, the tail section of frame body is further provided with a range finder connected with the microprocessor in the tail section of frame body.

An ultraviolet curing pipeline repair system is characterized by comprising the ultraviolet curing pipeline repair robot, a cable reel and a control system; and the cable reel comprises a power cable connected with the tail section of frame body, a second power carrier module configured to perform data interaction with the first power carrier module, a microprocessor and a network communication module configured to perform data transmission with the control system, wherein the second power carrier module, the microprocessor and the network communication module are connected in sequence.

The present invention has the beneficial effects that due to the adoption of the uniformly distributed ultraviolet LED lamps, more uniform radiation and strong adjustability are realized, the power consumption is lower, and the curing effect is improved; due to the combination of the spring sleeves and the driving arms, the stretching of the driving arms can be adjusted, so that demands of different pipe diameters can be met; pipes with all pipe diameters are not required to be reequipped with corresponding driving arms, so that more material and time costs are reduced; and due to the adoption of a power line carrier manner, the cable is only the power cable instead of a communication cable, so that the volume and weight of the cable are reduced, a dragging force can be reduced during use, and more convenience is brought.

In the figures, 1 front-view camera, 2 air pressure indicator lamp, 3 driving shaft, 4 spring sleeve, 5 wheel, 6 driving arm, 7 air valve, 8 first section of frame body, 9 driving arm nut, 10 lamp panel, 11 temperature sensor, 12 first aviation plug, 13 illuminating lamp, 14 middle section of frame body, 15 second aviation plug, 16 rear-view camera, 17 tail section of frame body, and 18 range finder.

DETAILED DESCRIPTION

The present invention is further described below in combination with specific examples and accompanying drawings.

Figure 1:
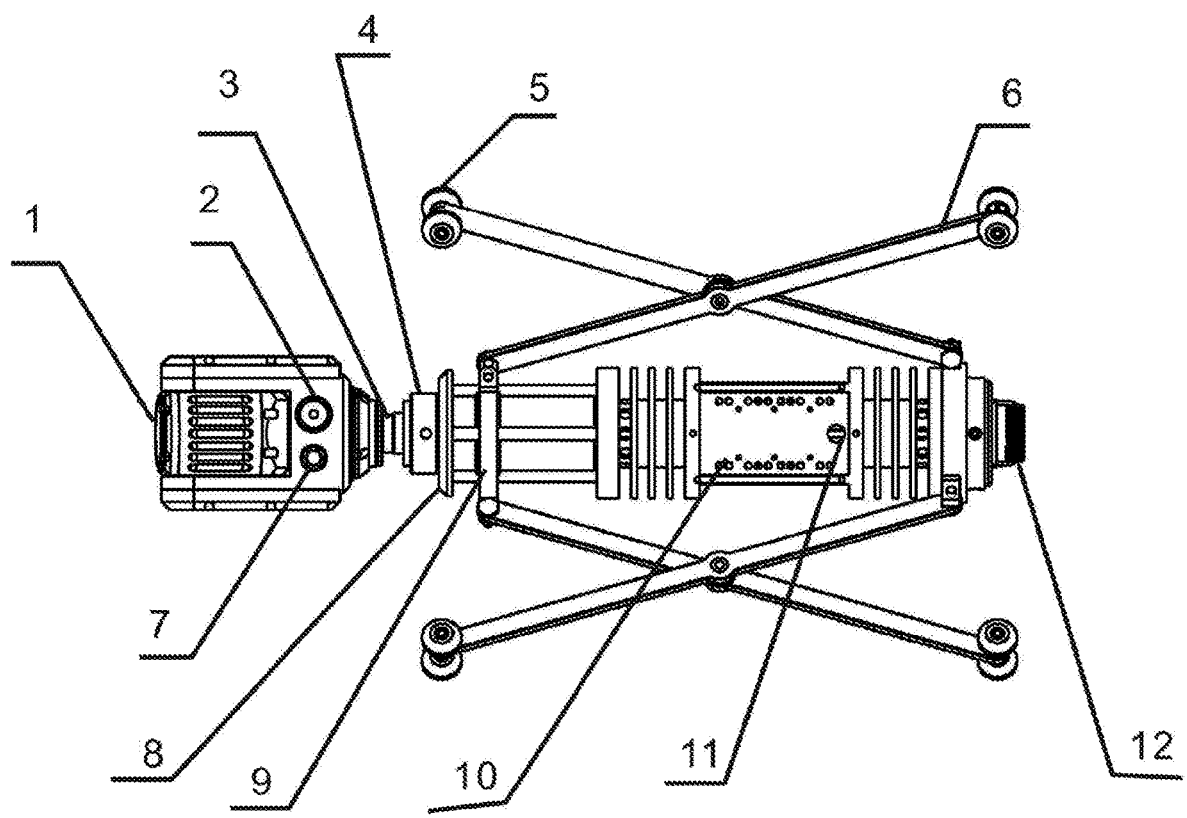
In FIG. 1 is a schematic structural diagram of a first section of frame body in one embodiment of the present invention.
Figure 2:
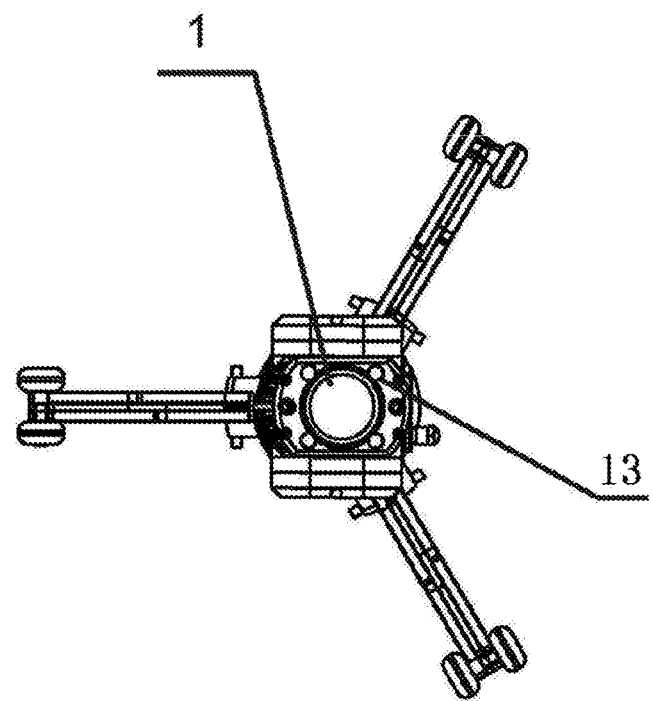
FIG. 2 is a left view of FIG. 1.
Figure 3:
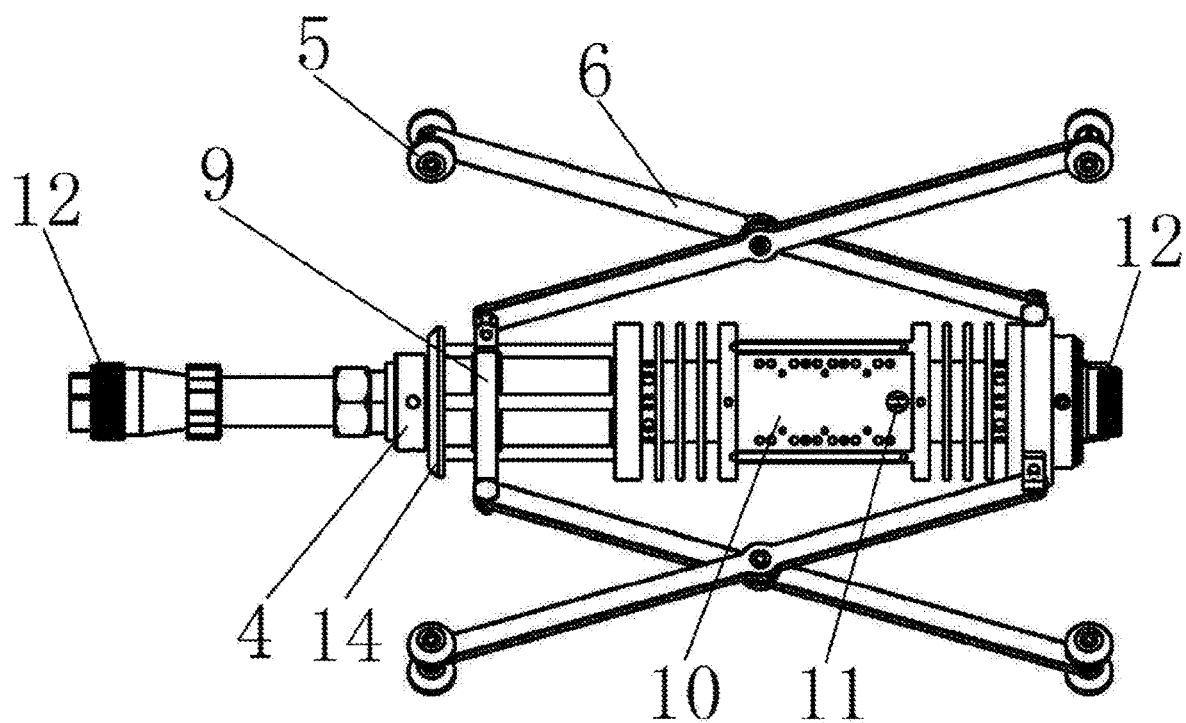
FIG. 3 is a schematic structural diagram of a middle section of frame body in one embodiment of the present invention.
Figure 4:
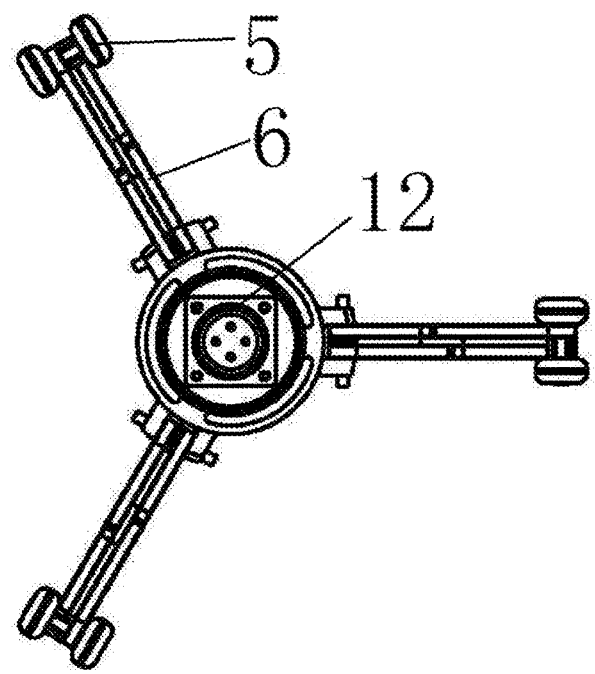
FIG. 4 is a side view of FIG. 3.
Figure 5:
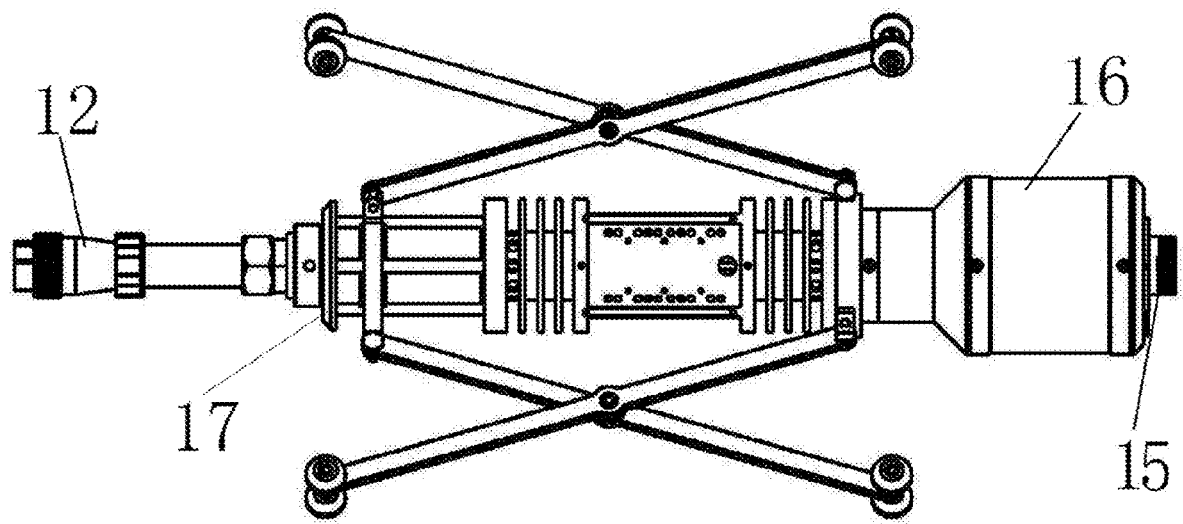
FIG. 5 is a schematic structural diagram of a tail section of frame body in one embodiment of the present invention.
Figure 6:
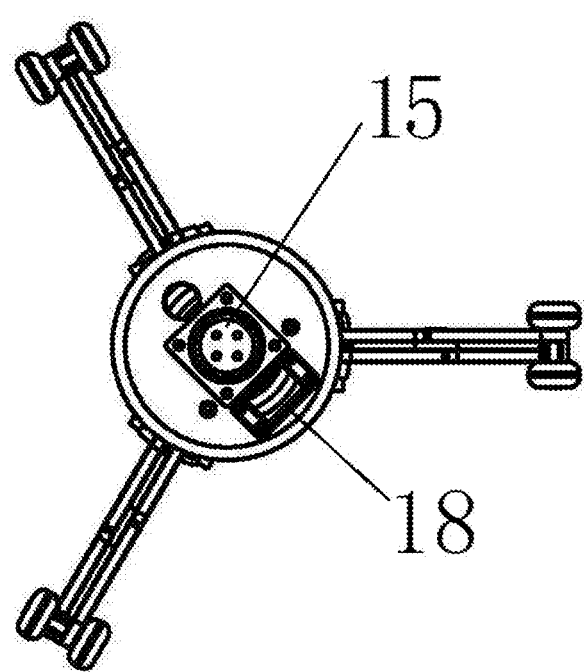
FIG. 6 is a right view of FIG. 5.

The present invention provides an ultraviolet curing pipeline repair robot, as shown in FIG. 1 to FIG. 6, frame bodies include a first section of frame body 8, a middle section of frame body 14 and a tail section of frame body 17, wherein the front end of the first section of frame body 8 is connected with a front-view camera 1, each section of frame body is fixedly provided with an ultraviolet radiation lamp and is connected with driving arms 6, and the tail ends of the driving arms 6 are connected with wheels 5 configured to roll on the inner wall of a pipeline; the first section of frame body 8 is connected with the middle section of frame body 14 by a first aviation plug 12, the two connected ends of the middle section of frame body 14 are provided with first aviation plugs 12, the middle section of frame body 14 is connected with the tail section of frame body 17 by a first aviation plug 12, and the tail end of the tail section of frame body 17 is provided with a second aviation plug 15 configured to be connected with a control system via a cable; and each ultraviolet radiation lamp comprises a lamp panel 10 distributed in the circumferential direction of the corresponding section of frame body and ultraviolet LED lamps uniformly distributed on the lamp panel 10. Found in a specific project, the curing efficiency of a robot in the prior art is unsatisfactory, and most of manufacturers starts with improvement from aspects such as an ultraviolet curing lined pipe material and a process, while found by careful exploration and analysis, mercury lamps are adopted in the prior art, the mercury lamps are non-uniform in radiation and poor in adjustability to result in low curing efficiency, the mercury lamps are replaced with the ultraviolet LED lamps which are uniformly distributed on the lamp panel 10 so as to be very uniform in radiation and very good in adjustability, and thus, the curing effect is improved. In addition, such replacement also brings some other effects such as high mercury lamp power consumption and heavy metal pollution, while the ultraviolet LED lamps are low in power consumption, capable of saving electrical energy and environment-friendly.

Each section of frame body is provided with a spring sleeve 4, the outer surface of the spring sleeve 4 is provided with a screw thread, and the spring sleeve 4 is capable of circumferentially rotating around the section of frame body; at least three driving arms 6 are provided and are uniformly distributed in the circumferential directions of the corresponding section of frame body; each driving arm 6 is formed by cross connection of two supporting arms, wherein one end of the first supporting arm is fixedly arranged on the corresponding section of frame body, the other end of the first supporting arm is connected with the corresponding wheel 5, one end of the second supporting arm is connected with a driving arm nut 9, the driving arm nut 9 sleeves the corresponding spring sleeve 4 and is matched with the screw thread on the outer surface of the spring sleeve 4, and the other end of the second supporting arm is connected with the corresponding wheel 5. In the present embodiment, each first supporting arm and the corresponding second supporting arm are connected to form an X shape. The first supporting arm and the second supporting arm may also be converted into other shapes such as a herringbone and an inverted V shape both of which may realize the stretching of the driving arm 6. During use, each driving arm nut 9 connected with the screw thread axially rotates along the corresponding section of frame body by rotating the screw thread of the corresponding spring sleeve 4 so as to drive the corresponding driving arm 6 to stretch out and draw back.

Each section of frame body is provided with an environment monitoring sensor, the inside of each section of frame body is provided with a microprocessor, the output end of the environment monitoring sensor is connected with the microprocessor, and the microprocessor is further connected with switch control ends of the ultraviolet LED lamps; the inside of the tail section of frame body is further provided with a network transmission module and a first power carrier module, and the first power carrier module is connected with the second aviation plug; and the cable is a power cable.

The outer part of the front-view camera 1 is provided with a shell, and the shell is provided with an air pressure indicator lamp 2 and an air valve 7 which are connected with the microprocessor in the first section of frame body 8. The shell of the front-view camera 1 is connected with a driving shaft 3 and a driving mechanism which are configured to drive the front-view camera 1 to rotate, and the driving mechanism is controlled by the microprocessor in the front section of frame body 8. The front of the front-view camera 1 is circumferentially provided with illuminating lamps 13 by which the front-view camera 1 may shoot clear pictures. The tail section of frame body is further connected with a rear-view camera 16, and the rear-view camera 16 is connected with the microprocessor in the tail section of frame body 17. The tail section of frame body 17 is further provided with a range finder 18 connected with the microprocessor in the tail section of frame body 17.

An ultraviolet curing pipeline repair system comprises the ultraviolet curing pipeline repair robot, a cable reel and a control system; and the cable reel comprises a power cable connected with the tail section of frame body 17, a second power carrier module configured to perform data interaction with the first power carrier module, a microprocessor and a network communication module configured to perform data transmission with the control system, wherein the second power carrier module, the microprocessor and the network communication module are connected in sequence.

Data acquired by the environment monitoring sensor, the front-view camera 1, the rear-view camera 16 and the range finder 18 are all transmitted to the network transmission module via the microprocessors, then, a digital signal is carried into a power signal via the first power carrier module to become a power carrier signal to be transmitted to the cable reel, and the power carrier signal is parsed by the second power carrier module in the cable reel to form a digital signal which is then transmitted to the control system via a network; and a control signal of the control system is transmitted to the cable reel via a network, the power signal is carried by the second power carrier module and is transmitted to the first power carrier module, the power carrier signal carrying the control signal is parsed by the first power carrier module to form a digital signal, and then, the digital signal is transmitted to all microprocessors by the network transmission module so as to be controlled.

The above-mentioned embodiments are merely intended to describe the design concept and features of the present invention and aim at making those skilled in the art know about the content of the present invention and implement the embodiments according to the content, but the protective scope of the present invention is not limited to the above-mentioned embodiments. Therefore, all equivalent variations or modifications made based on the principle and design thought of the present invention shall fall within the protective scope of the present invention.

What is claimed is:

1. An ultraviolet curing pipeline repair robot, comprising several sections of frame bodies connected in sequence to form a frame body, the frame bodies comprising a first section of the frame body, a middle section of the frame body and a tail section of the frame body, wherein a front end of the first section of the frame body is connected with a front-view camera, each section of the frame body is fixedly provided with an ultraviolet radiation lamp and is connected with driving arms, and tail ends of the driving arms are connected with wheels configured to roll on an inner wall of a pipeline wherein the first section of the frame body is connected with the middle section of the frame body by at least one of first aviation plugs, two connected ends of the middle section of the frame body are provided with the first aviation plugs, the middle section of the frame body is connected with the tail section of the frame body by at least one of the first aviation plugs, and a tail end of the tail section of the frame body is provided with a second aviation plug configured to be connected with a control system via a cable;

each ultraviolet radiation lamp comprises a lamp panel distributed in a circumferential direction of the corresponding section of the frame body and ultraviolet LED lamps uniformly distributed on the lamp panel;

each section of the frame body is provided with a spring sleeve, an outer surface of the spring sleeve is provided with a screw thread, and the spring sleeve is capable of circumferentially rotating around the section of the frame body;

at least three driving arms are provided and are uniformly distributed in the circumferential direction of the corresponding section of the frame body; each driving arm is formed by cross connection of two supporting arms, wherein one end of a first supporting arm is fixedly arranged on the corresponding section of the frame body, the other end of the first supporting arm is connected with the corresponding wheel, one end of a second supporting arm is connected with a driving arm nut, the driving arm nut sleeves the corresponding spring sleeve and is matched with the screw thread on the outer surface of the spring sleeve, and the other end of the second supporting arm is connected with the corresponding wheel; and each section of the frame body is provided with an environment monitoring sensor, an inside of each section of the frame body is provided with a microprocessor, an output end of the environment monitoring sensor is connected with the microprocessor, and the microprocessor is further connected with switch control ends of the ultraviolet LED lamps; the inside of the tail section of the frame body is further provided with a network transmission module and a first power carrier module, and the first power carrier module is connected with the second aviation plug; and the cable is a power cable.

2. The ultraviolet curing pipeline repair robot according to claim 1, wherein an outer part of the front-view camera is provided with a shell, and the shell is provided with an air pressure indicator lamp and an air valve which are connected with the microprocessor in the first section of the frame body.

3. The ultraviolet curing pipeline repair robot according to claim 2, wherein the shell of the front-view camera is connected with a driving shaft and a driving mechanism which are configured to drive the front-view camera to rotate, and the driving mechanism is controlled by the microprocessor in the front section of the frame body.

4. The ultraviolet curing pipeline repair robot according to claim 1, wherein the tail section of the frame body is further connected with a rear-view camera, and the rear-view camera is connected with the microprocessor in the tail section of the frame body.

5. The ultraviolet curing pipeline repair robot according to claim 4, wherein the tail section of the frame body is further provided with a range finder connected with the microprocessor in the tail section of the frame body.

6. An ultraviolet curing pipeline repair system, comprising the ultraviolet curing pipeline repair robot according to claim 1, a cable reel and a control system wherein the cable reel comprises a power cable connected with the tail section of the frame body, a second power carrier module configured to perform data interaction with the first power carrier module, the microprocessor and a network communication module configured to perform data transmission with the control system, wherein the second power carrier module, the microprocessor and the network communication module are connected in sequence.

7. An ultraviolet curing pipeline repair system, comprising the ultraviolet curing pipeline repair robot according to claim 2, a cable reel and a control system, wherein
the cable reel comprises a power cable connected with the tail section of the frame body, a second power carrier module configured to perform data interaction with the first power carrier module, the microprocessor and a network communication module configured to perform data transmission with the control system, wherein the second power carrier module, the microprocessor and the network communication module are connected in sequence.

8. An ultraviolet curing pipeline repair system, comprising the ultraviolet curing pipeline repair robot according to claim 3, a cable reel and a control system, wherein
the cable reel comprises a power cable connected with the tail section of the frame body, a second power carrier module configured to perform data interaction with the first power carrier module, the microprocessor and a network communication module configured to perform data transmission with the control system, wherein the second power carrier module, the microprocessor and the network communication module are connected in sequence.

9. An ultraviolet curing pipeline repair system, comprising the ultraviolet curing pipeline repair robot according to claim 4, a cable reel and a control system, wherein
the cable reel comprises a power cable connected with the tail section of the frame body, a second power carrier module configured to perform data interaction with the first power carrier module, the microprocessor and a network communication module configured to perform data transmission with the control system, wherein the second power carrier module, the microprocessor and the network communication module are connected in sequence.

10. An ultraviolet curing pipeline repair system, comprising the ultraviolet curing pipeline repair robot according to claim 5, a cable reel and a control system, wherein
the cable reel comprises a power cable connected with the tail section of the frame body, a second power carrier module configured to perform data interaction with the first power carrier module, the microprocessor and a network communication module configured to perform data transmission with the control system, wherein the second power carrier module, the microprocessor and the network communication module are connected in sequence.

* * * * *